Patented Mar. 8, 1949

2,463,738

UNITED STATES PATENT OFFICE 2,463,738

STABLE EMULSIONS OF OIL AND GLYCERINE

Finn W. Bernhart, Holt, Mich., assignor to Wyeth Incorporated, Philadelphia, Pa., a corporation of Delaware No Drawing. Application August 13, 1947, Serial No. 768,496

6 Claims. (Cl. 167—81)

This invention relates to the preparation of stable, substantially anhydrous emulsions of oily material and a glycerol and more particularly relates to the preparation of a stable emulsion of vitamins in glycerine.

In the preparation of pharmaceutical and cosmetic products it is often desirable to obtain non-aqueous emulsions containing water-soluble and fat-soluble ingredients combined together in a clear homogeneous composition and often one may desire to combine fat and water-soluble ingredients one or more of which, in either category, may be unstable in the presence of water.

As an example of a product which has not heretofore been attained, a particularly desirable composition is a mixture of oil and water-soluble vitamins, substantially free of water and containing large enough quantities of the vitamins so that a small amount, for example 1 cc., will supply all the daily requirements of an individual.

In the vitamin field, various carriers and solubilizing agents, both aqueous and anhydrous, have been tried in an effort to obtain homogeneous mixtures of the fat-soluble and the water-soluble types in which a substantial amount of both types of vitamins can be orally administered.

Considering the aqueous type of carrier, or compositions containing water, present complete vitamin mixtures containing vitamin C have a short shelf life because of the instability of ascorbic acid in aqueous media as compared to anhydrous media. With regard to anhydrous compositions as heretofore suggested, the non-aqueous media proposed as solvents for the fat-soluble vitamins have been solvents in which the oil-soluble vitamins are sparingly soluble. As a consequence, highly concentrated vitamins must be used and the resulting oral dosage has an unusually, and many times undesirably, low vitamin potency.

This invention is directed to the preparation of clear, homogeneous, substantially anhydrous emulsions which may contain up to 50% oil and with regard to emulsions containing fat-soluble vitamins, without limitation as to the use of highly concentrated vitamins as in the case of solutions.

Basically, I have discovered that oils or fatty material may be emulsified in glycerol to produce a stable, non-aqueous emulsion by incorporating in the composition a small amount of an alcohol-soluble protein or a mixture of them or a material containing one or more of these proteins in substantial proportions. These proteins are generally also identified as prolamines.

Utilizing this discovery for the preparation of vitamin compositions, I have found that the fat-soluble vitamins alone or a mixture of fat-soluble and water-soluble vitamins may be incorporated in glycerol to produce stable, non-toxic emulsions by the use of a small amount of a prolamine, a mixture of prolamines or a material containing an effective proportion of such substances.

I have further found that stable vitamin emulsions may thus be prepared containing oleaginous material containing soluble vitamins in high or low concentration, as desired. It should be noted that the fat-soluble vitamins used may either be susbtantially free of oil or fat or these oily materials may be present in the form of vitamin-bearing oils or fats.

The oil or fat may be of vegetable, mineral, animal or of marine derivation and for the particular purpose desired, those oils are preferred which are rich or have been enriched in vitamins A, D and E.

The glycerine base is non-toxic and substantially tasteless and has been found to be an excellent carrier for vitamins A, D and E, as well as vitamin mixtures of the fat-soluble and water-soluble types. Thus, the vitamins suitable for incorporation in glycerol are not only the fat-soluble types A, D and E, but also the water-soluble vitamins $B_1$, $B_2$, $B_6$ and other members of the B complex group as well as vitamin C. In the composition, the glycerol base may range widely in amount, from about 50% to about 98% by weight, based on the entire composition.

In order to obtain a stable emulsion of any or all of these vitamins in glycerine, I have discovered that prolamines are highly effective as emulsifying agents since they have lyophobic groups directed toward the oil phase and lyophylic groups directed toward the glycerol phase. These prolamines are also unique in that in contradistinction to most proteins they are soluble in glycerol. While the more common and well-known prolamines such as gliadin and zein are preferred, all the alcohol-soluble proteins are suitable as emulsifying agents.

The amount of prolamine necessary to achieve satisfactory emulsification ranges from at least 0.25% to about 5% by weight, based on the glycerol base. A single prolamine or a mixture of prolamines may be used for emulsifying and if desired, other well-known emulsifying and stabilizing agents may be used together with the prolamine. Such well-known agents useful as auxiliary emulsifying or stabilizing agents are the long chain fatty acid partial esters of hexitol anhydrides or the polyoxyalkylene derivatives thereof or mixtures thereof, and of these, sorbitan monolaurate or a polyoxyalkylene derivative thereof, sorbitan monostearate or sorbitan monooleate are preferred. It should be pointed out however, that these auxiliary emulsifying agents will not, by themselves, disperse fat-soluble vitamins in the glycerol in a satisfactory manner.

The following examples illustrate the preparation of specific vitamin compositions but it should be clearly understood that the invention is not to be limited to the specific procedures, proportions or ingredients to be described excepting as may be indicated in the claims.

Example I

One gram of zein and 0.15 grams of phosphoric acid were added to 80 cc. of glycerine. The mixture was heated to about 140° C. until the zein went into solution. After cooling to room temperature, 20 cc. of soybean oil was added and the mixture homogenized by passing several times through a small hand homogenizer. An emulsion which was almost perfectly clear and of good stability was obtained.

Example II

One gram of gliadin was put in solution in 50 cc. of glycerine with heat (125° C.), cooled, and 20 cc. of soybean oil was added. The mixture was homogenized. A microscopic examination of particle sizes revealed the following distribution:

| | Per cent |
|---|---|
| 0.8 micron and less | 70 |
| 0.8 to 3.2 micron | 25 |
| Greater than 3.2 micron | 5 |

(9.6 microns was largest observed droplet)

This indicates a very good emulsion was formed. After standing one month, at room temperature, the particle size distribution had not changed indicating a high degree of stability.

Example III

One gram of gliadin, 85 cc. of glycerine and 15 cc. of mineral oil (U.S.P. XIII grade, viscosity 38.1 centistokes at 37.8° C.; sp. gr. 0.086 to 0.905) were mixed and heated to 125° C. for ten minutes. After this time the gliadin was in solution. Allowed to cool to room temperature and homogenized in laboratory hand homogenizer. An emulsion resulted with the following size distribution:

| | Per cent |
|---|---|
| 0.8 micron and less | 20 |
| 0.8 micron to 4 microns | 70 |
| 4 microns and greater | 10 |

(8.6 microns was largest observed droplet)

This indicates a well prepared emulsion.

Example IV 25 cc. of cod liver oil having a vitamin A potency of 850 U.S.P. units per gram and 100 U.S.P. units per gram vitamin D potency were emulsified with 75 cc. of glycerine U.S.P. containing 1 gram of gliadin, 10 mg. of vanillin and 3 drops of oil of lemon dissolved in it. The oil and glycerine mixture at 45° C. were stirred together and homogenized by passing through a laboratory hand homogenizer several times. A homogeneous, translucent emulsion was obtained which was stable. The emulsion dispersed readily in water and milk and the undiluted emulsion had a much more pleasant taste than the original cod liver oil.

Example V

A glycerine solution was prepared by dissolving one gram of gliadin in 75 cc. of glycerine by heating to 125° C. and stirring. When cooled to 60-70° C., 6.65 grams ascorbic acid and 0.125 gram of thiamine hydrochloride were dissolved by stirring. Five cc. of glycerine, one gram of vanillin, 3.1 grams of nicotinamide and 0.144 grams of riboflavin were heated to 125° C., stirred until the riboflavin was dissolved, and added immediately to the gliadin-vitamin glycerin mixture. The mixture was cooled in a closed container and the volume made up to 98 cc. with glycerine.

One gram of vitamin A concentrate (1,000,000 U.S.P. units per gram), 0.7 grams of mixed natural tocopherols containing 34% tocopherol and 0.3 gram of vitamin D concentrate (1,000,000 U.S.P. units per gram) were mixed and added to the glycerine solution, stirred and homogenized in a laboratory hand homogenizer. Particle size distribution of the emulsion was:

| | Per cent |
|---|---|
| 1.6 to 2.4 microns | 80 |
| 4 microns and greater | 20 |

This size analysis indicates a well prepared emulsion. Stability on standing at room temperature indicates a stable emulsion.

Example VI

A glycerine solution was prepared by dissolving 10 grams of gliadin in 750 cc. of glycerine by heating to 125° C. and stirring. When the mixture had cooled to 60–70° C., 66.5 grams of ascorbic acid and 1.25 grams of thiamine hydrochloride were dissolved therein. To this was added while still hot, 10 grams of vanillin, 31.1 grams of nicotinamide and 1.44 grams of riboflavin which had been separately dissolved in 50 cc. of glycerine and heated to 125° C.

The total solution was cooled in a closed container to room temperature and the volume was made up to 960 cc. by the addition of a further amount of glycerine.

A fat-soluble vitamin solution was prepared by mixing 10 grams of vitamin A concentrate containing 500,000 units per gram, 7 grams of mixed natural tocopherols containing 34% tocopherol, 3 grams of vitamin D concentrate in vegetable oil containing 1,150,000 U.S.P. units, and 20 grams of sorbitan monolaurate.

The oil mixture was added to the glycerine solution and thoroughly homogenized in the absence of air.

After standing at room temperature for 7 months the particle size distribution was:

| | Per cent |
|---|---|
| 0.8 microns or less | 75 |
| 1.6–2.4 microns | 20 |
| 4.0 microns or larger | 5 |

This size analysis indicates a well prepared emulsion. Stability on standing at room temperature indicates a stable emulsion.

I claim:

1. A stable, substantially non-aqueous composition comprising an emulsion of an oleaginous material in glycerol and a small amount of a prolamine as an emulsifying and stabilizing agent.

2. A stable, substantially non-aqueous vitamin composition comprising an emulsion of a vitamin-rich oil in glycerol and a small amount of a prolamine as an emulsifying and stabilizing agent.

3. A stable, substantially non-aqueous vitamin composition comprising an emulsion of a fat-soluble vitamin in a glycerol and a small amount of a prolamine as an emulsifying and stabilizing agent.

4. A stable, substantially non-aqueous vitamin composition comprising an emulsion of a fat-soluble and water-soluble vitamin in a glycerol and a small amount of a prolamine as an emulsifying and stabilizing agent.

5. A stable, substantially non-aqueous vitamin composition comprising an emulsion of a fat-soluble vitamin in glycerol and a small amount of zein as an emulsifying and stabilizing agent.

6. A stable, substantially non-aqueous vitamin composition comprising an emulsion of a fat-soluble vitamin in glycerol and a small amount of gliadin as an emulsifying and stabilizing agent.

FINN W. BERNHART.

REFERENCES CITED

The following references are of record in the file of this patent:

UNITED STATES PATENTS

| Number | Name | Date |
| --- | --- | --- |
| 1,663,323 | Whatmaugh | Mar. 20, 1928 |
| 1,884,015 | Longovoy | Oct. 25, 1932 |
| 2,218,591 | Taylor | Oct. 22, 1940 |
| 2,356,350 | Peters | Aug. 22, 1944 |